(12) United States Patent
VanBlon et al.

(10) Patent No.: US 11,094,327 B2
(45) Date of Patent: Aug. 17, 2021

(54) AUDIBLE INPUT TRANSCRIPTION

(71) Applicant: Lenovo (Singapore) Pte. Ltd., Singapore (SG)

(72) Inventors: Russell Speight VanBlon, Raleigh, NC (US); Kevin Wayne Beck, Raleigh, NC (US); Thorsten Peter Stremlau, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 97 days.

(21) Appl. No.: 16/146,197

(22) Filed: Sep. 28, 2018

(65) Prior Publication Data

US 2020/0105269 A1 Apr. 2, 2020

(51) Int. Cl.
*G10L 15/26* (2006.01)
*G10L 15/22* (2006.01)
*G06F 16/332* (2019.01)

(52) U.S. Cl.
CPC .......... *G10L 15/26* (2013.01); *G06F 16/3323* (2019.01); *G10L 15/22* (2013.01); *G10L 2015/225* (2013.01)

(58) Field of Classification Search
None
See application file for complete search history.

(56) References Cited

U.S. PATENT DOCUMENTS

| | | | | |
|---|---|---|---|---|
| 5,826,233 A * | 10/1998 | Matsumoto | ............. | G10L 15/22 704/275 |
| 6,424,935 B1 * | 7/2002 | Taylor | .................. | G10L 15/065 704/10 |
| 7,684,828 B2 * | 3/2010 | Lee | .................. | H04M 1/72427 455/566 |
| 8,731,935 B2 * | 5/2014 | Chavez | ............... | H04M 3/2281 704/270 |
| 8,803,687 B2 * | 8/2014 | Valiulis | .................... | H04N 5/77 340/571 |
| 8,868,223 B1 * | 10/2014 | Sharifi | .................. | G06F 16/683 700/94 |
| 9,043,205 B2 * | 5/2015 | Mengibar | ............. | G06F 16/387 704/235 |
| 9,199,723 B2 * | 12/2015 | Yamasaki | ............... | B64C 13/16 |
| 9,275,539 B2 * | 3/2016 | Kim | .................. | H04M 1/72424 |
| 9,998,790 B1 * | 6/2018 | Logan | ............... | H04N 21/4532 |
| 2002/0103651 A1 * | 8/2002 | Alexander | ............. | G10L 15/26 704/275 |
| 2002/0133341 A1 * | 9/2002 | Gillick | .................... | G10L 15/32 704/235 |
| 2002/0156830 A1 * | 10/2002 | Gayama | .................. | H04L 67/18 709/201 |

(Continued)

*Primary Examiner* — Thuykhanh Le
(74) *Attorney, Agent, or Firm* — Ference & Associates LLC (57) ABSTRACT

One embodiment provides a method, comprising: capturing, at an information handling device, audible input from at least one user; providing, on a display device operatively coupled to the information handling device, at least one transcription suggestion, wherein the at least one transcription suggestion is associated with a portion of the audible input; and inputting, responsive to receiving a selection input on the at least one transcription suggestion, the at least one transcription suggestion into an underlying application. Other aspects are described and claimed.

20 Claims, 4 Drawing Sheets

(56) References Cited

U.S. PATENT DOCUMENTS

| | | | |
|---|---|---|---|
| 2005/0192061 A1* | 9/2005 | May | G10L 13/00 455/563 |
| 2007/0139399 A1* | 6/2007 | Cook | G06F 3/03545 345/179 |
| 2007/0185601 A1* | 8/2007 | Lee | G06F 3/16 700/94 |
| 2008/0059193 A1* | 3/2008 | Huang | G10L 15/00 704/260 |
| 2008/0284587 A1* | 11/2008 | Saigh | H04M 1/72424 340/539.13 |
| 2009/0018831 A1* | 1/2009 | Morita | G10L 15/24 704/246 |
| 2009/0052636 A1* | 2/2009 | Webb | G10L 15/26 379/88.14 |
| 2009/0210227 A1* | 8/2009 | Sugiyama | G10L 15/22 704/246 |
| 2010/0118158 A1* | 5/2010 | Boland | H04N 5/765 348/211.2 |
| 2010/0211972 A1* | 8/2010 | Howarter | H04H 20/106 725/33 |
| 2010/0256785 A1* | 10/2010 | Lloyd | G05B 19/0423 700/83 |
| 2010/0297981 A1* | 11/2010 | Ballantyne | H04W 4/029 455/404.2 |
| 2010/0332003 A1* | 12/2010 | Yaguez | G10L 17/00 700/94 |
| 2011/0060591 A1* | 3/2011 | Chanvez | H04M 3/42221 704/270 |
| 2011/0105190 A1* | 5/2011 | Cha | G10L 15/26 455/566 |
| 2011/0106537 A1* | 5/2011 | Funyak | G06F 40/143 704/260 |
| 2011/0153620 A1* | 6/2011 | Coifman | G10L 15/065 707/748 |
| 2011/0161076 A1* | 6/2011 | Davis | G06F 3/04842 704/231 |
| 2011/0195739 A1* | 8/2011 | Deleus | H04W 4/00 455/518 |
| 2011/0211680 A1* | 9/2011 | Wilson | H04M 1/72433 379/88.23 |
| 2011/0252316 A1* | 10/2011 | Pahud | G06F 40/58 715/264 |
| 2011/0257973 A1* | 10/2011 | Chutorash | B60R 16/0373 704/235 |
| 2011/0288910 A1* | 11/2011 | Garg | G06Q 30/06 705/14.1 |
| 2012/0022865 A1* | 1/2012 | Milstein | G10L 15/10 704/235 |
| 2012/0034904 A1* | 2/2012 | LeBeau | G10L 15/26 455/414.1 |
| 2012/0084025 A1* | 4/2012 | van Schie | G05D 9/12 702/55 |
| 2012/0089401 A1* | 4/2012 | Hymel | G10L 15/1822 704/260 |
| 2012/0135685 A1* | 5/2012 | Higgins | H04B 1/385 455/41.2 |
| 2012/0176313 A1* | 7/2012 | Ryu | G10L 15/26 345/158 |
| 2012/0295562 A1* | 11/2012 | Sorensen | H03G 3/3089 455/127.2 |
| 2012/0313849 A1* | 12/2012 | Bak | G06F 3/167 345/156 |
| 2013/0054237 A1* | 2/2013 | Furman | G10L 15/26 704/235 |
| 2013/0060379 A1* | 3/2013 | Choe | B60L 1/003 700/245 |
| 2013/0117027 A1* | 5/2013 | Choi | G10L 15/26 704/275 |
| 2013/0124984 A1* | 5/2013 | Kuspa | H04N 21/4307 715/255 |
| 2013/0173270 A1* | 7/2013 | Han | G06F 3/167 704/275 |
| 2013/0204445 A1* | 8/2013 | Ikeda | G05F 5/00 700/286 |
| 2013/0238341 A1* | 9/2013 | You | G10L 25/48 704/275 |
| 2013/0262096 A1* | 10/2013 | Wilhelms-Tricarico | G10L 13/04 704/202 |
| 2013/0322634 A1* | 12/2013 | Bennett | H04R 5/04 381/17 |
| 2013/0339030 A1* | 12/2013 | Ehsani | G10L 17/00 704/275 |
| 2014/0052480 A1* | 2/2014 | Bell | G06Q 40/08 705/4 |
| 2014/0072137 A1* | 3/2014 | Nelson | H04R 1/1041 381/74 |
| 2014/0086458 A1* | 3/2014 | Rogers | G10L 15/00 382/118 |
| 2014/0122070 A1* | 5/2014 | Prus | G08G 5/0021 704/235 |
| 2014/0163976 A1* | 6/2014 | Park | G10L 15/00 704/231 |
| 2015/0051913 A1* | 2/2015 | Choi | H04M 1/67 704/273 |
| 2015/0120300 A1* | 4/2015 | Maruta | G06F 16/685 704/251 |
| 2015/0340036 A1* | 11/2015 | Weeks | G10L 15/26 704/235 |
| 2015/0356836 A1* | 12/2015 | Schlesinger | G08B 3/10 704/235 |
| 2015/0378986 A1* | 12/2015 | Amin | G06F 40/289 704/9 |
| 2016/0062983 A1* | 3/2016 | Jung | G10L 15/1822 704/9 |
| 2016/0103824 A1* | 4/2016 | Zupancic | G06F 40/205 704/9 |
| 2016/0170969 A1* | 6/2016 | Allen | G06F 16/4393 704/9 |
| 2017/0068670 A1* | 3/2017 | Orr | G06F 3/048 |
| 2017/0195576 A1* | 7/2017 | Desai | H04N 5/23238 |
| 2017/0287482 A1* | 10/2017 | Jackson | G10L 15/26 |
| 2017/0374273 A1* | 12/2017 | Butts | G10L 15/22 |
| 2018/0091643 A1* | 3/2018 | Singh | H04M 3/42391 |
| 2018/0270446 A1* | 9/2018 | Weil | H04N 5/9207 |
| 2018/0330736 A1* | 11/2018 | Faulkner | H04L 65/403 |
| 2019/0327524 A1* | 10/2019 | Milavsky | H04N 21/44222 |
| 2020/0075000 A1* | 3/2020 | Merhej | G10L 15/22 |

* cited by examiner

AUDIBLE INPUT TRANSCRIPTION

BACKGROUND

Information handling devices ("devices"), for example smart phones, tablet devices, smart speakers, laptop and personal computers, and the like, may be capable of receiving and processing audible user input. For example, one or more users may provide audible input directly to a device (e.g., via an audible query or command, etc.) or may produce audible input as they are interacting with one another (e.g., while talking in a meeting, etc.) that is passively captured by the device (e.g., via always on audible input devices, etc.). The received/captured audible input may be recorded by the device and thereafter transcribed into machine typeset. The machine typeset may then be inserted into particular portions of an underlying application (e.g., a note-taking application, etc.).

BRIEF SUMMARY

In summary, one aspect provides a method, comprising: capturing, at an information handling device, audible input from at least one user; identifying, using a processor, a portion of the audible input corresponding to a user's interest; and providing, on a display device operatively coupled to the information handling device, at least one transcription suggestion associated with the portion.

Another aspect provides an information handling device, comprising: a display device; a processor; a memory device that stores instructions executable by the processor to: capture audible input from at least one user; identify a portion of the audible input corresponding to a user's interest; and provide, on the display device, at least one transcription suggestion associated with the portion, wherein the at least one transcription suggestion is associated with a portion of the audible input.

A further aspect provides a method, comprising: capturing, at an information handling device, audible input from at least one user; segmenting, using a processor, the audible input into one or more transcribed phrases; determining, by accessing a predetermined ruleset, which of the one or more transcribed phrases to input to an underlying application; and automatically inputting, without user selection input, the determined one or more transcribed phrases to the underlying application.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Audible input transcription ("voice transcription") is often utilized in work and business environments to produce a text-based record of vocally discussed topics. For example, automatic voice transcription techniques are able to capture and analyze voice input and thereafter generate a faithful transcription of the voice input with no or minimal assistance from a user. These techniques are frequently employed during business calls and meetings to produce a record of the topics discussed during the call or meeting. Additionally, manual voice transcription methods (i.e., in which a human user is manually typing the text that corresponds to the audible word or phrase, etc.) are also commonly utilized to record the topics discussed (e.g., in court room settings, etc.)

These conventional methods of transcribing voice input are not without their flaws. For example, automatic voice transcription results in lots of unnecessary data. In many situations, a user may only desire to know what a specific individual said or what was said about a particular topic. In these cases, the user may need to shift through a great deal of extraneous text to find the portions of the transcription that they are interested in. Although a user can later edit the transcribed document to remove the unnecessary portions, this may be burdensome and time-consuming. With respect to manual transcription, this technique requires a human transcriber's full attention and makes it difficult for the transcriber to participate in the conversation if they wanted to do so. Manual transcription may be especially difficult if there are many different speakers, if the topics being discussed are complex, and if the conversation is occurring at a high speed. As such Accordingly, an embodiment provides a method for transcribing the portions of audible input that are of interest to the user. In an embodiment, audible input may be captured by a device (e.g., via one or more microphones, other audible inputs devices, etc.). An embodiment may then transcribe the audible input and provide a transcription suggestion to a user (e.g., on a display screen, etc.). The transcription suggestion may be a suggestion of one or more words or phrases that a user may want to input to an underlying application (e.g., a note-taking application, etc.) The transcription suggestion may be identified and provided by consulting one or more predetermined rulesets. Responsive to receiving a selection input on the transcription suggestion, an embodiment may then input the transcription suggestion into a desired portion of an underlying application. Such a method may only input the user-desired portions of audible input into a transcription document.

In another embodiment, in lieu of receiving manual selection input from a user, an embodiment may be able to dynamically determine which of the transcribed words or phrases should be input to an underlying application. The determination may be made intelligently (e.g., by consulting a predetermined ruleset, etc.) and automatically (e.g., without receiving user selection input, etc.). Responsive to the determination, an embodiment may then automatically input the intelligently determined word or phrase into an underlying application. As an example of the foregoing, a ruleset may dictate that only voice input provided by Speaker A be transcribed and input to an underlying application. Responsive to receiving voice input from a plurality of providers and thereafter identifying the provider of each portion of voice input, an embodiment may then only select the portions of the voice input provided by Speaker A to input to an underlying application, The illustrated example embodiments will be best understood by reference to the figures. The following description is intended only by way of example, and simply illustrates certain example embodiments.

Figure 1:
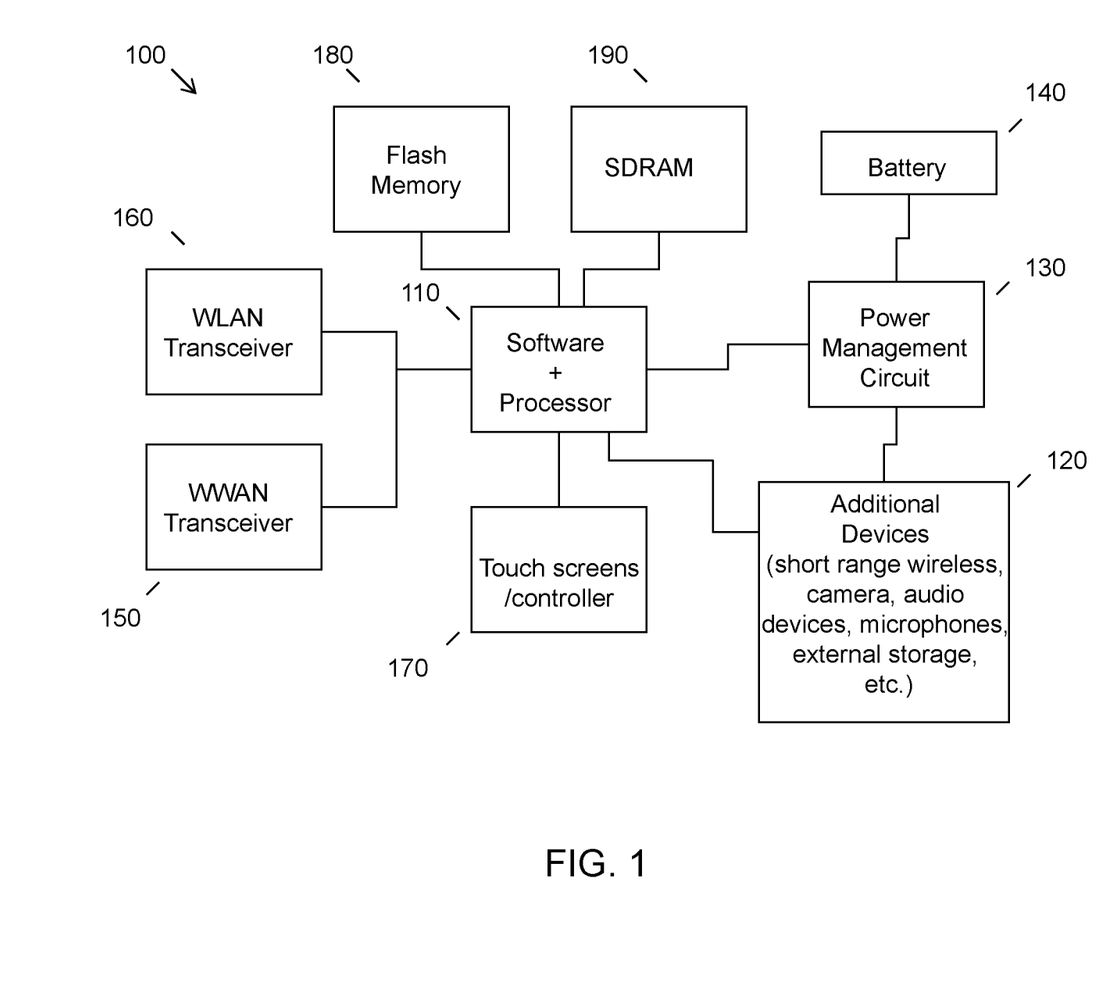
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
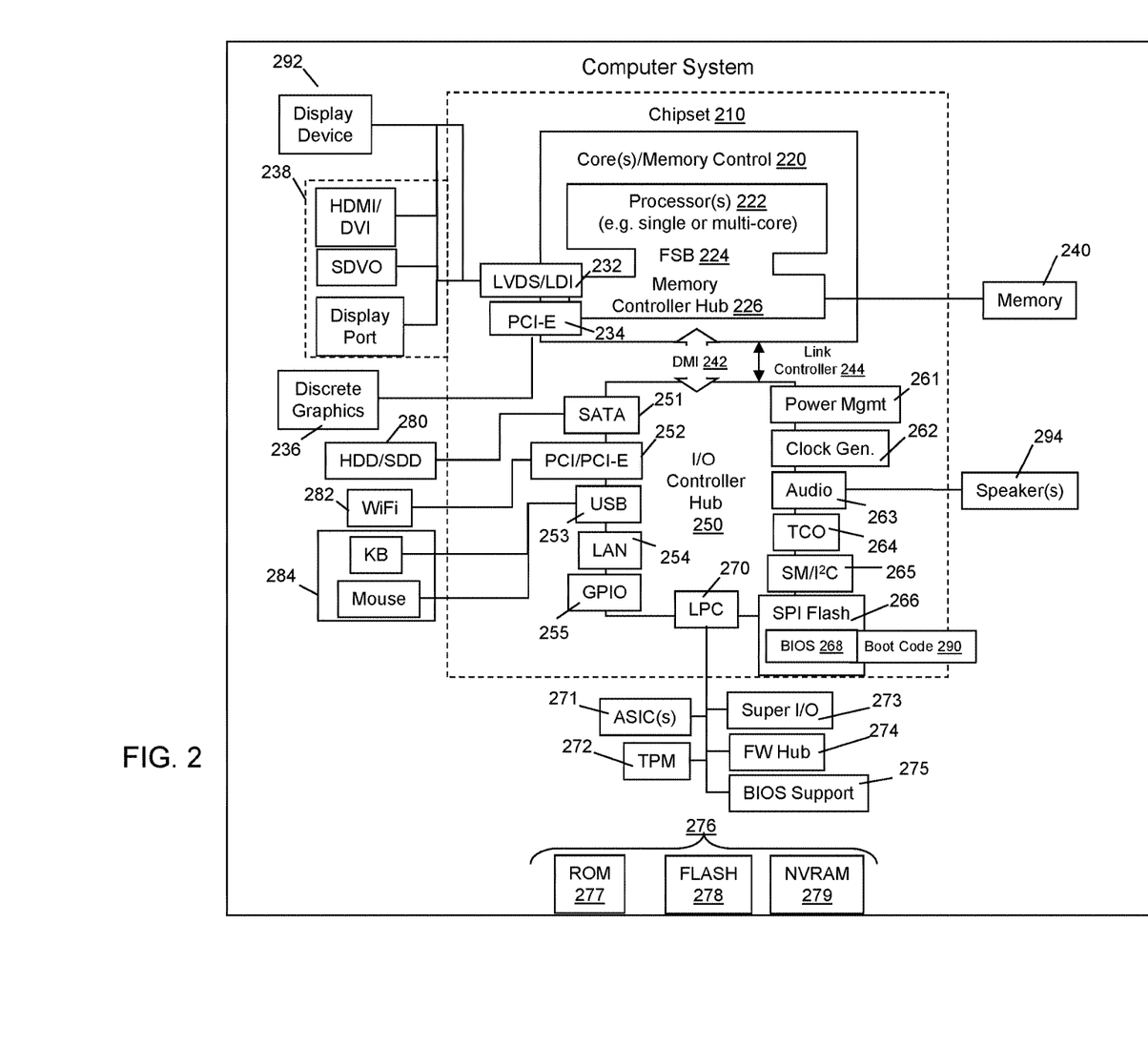
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, smart appliances, personal computer devices generally, and/or electronic devices that are capable of capturing and transcribing voice inputs. For example, the circuitry outlined in FIG. 1 may be implemented in a tablet or smart phone embodiment, whereas the circuitry outlined in FIG. 2 may be implemented in a laptop embodiment.

Figure 3:
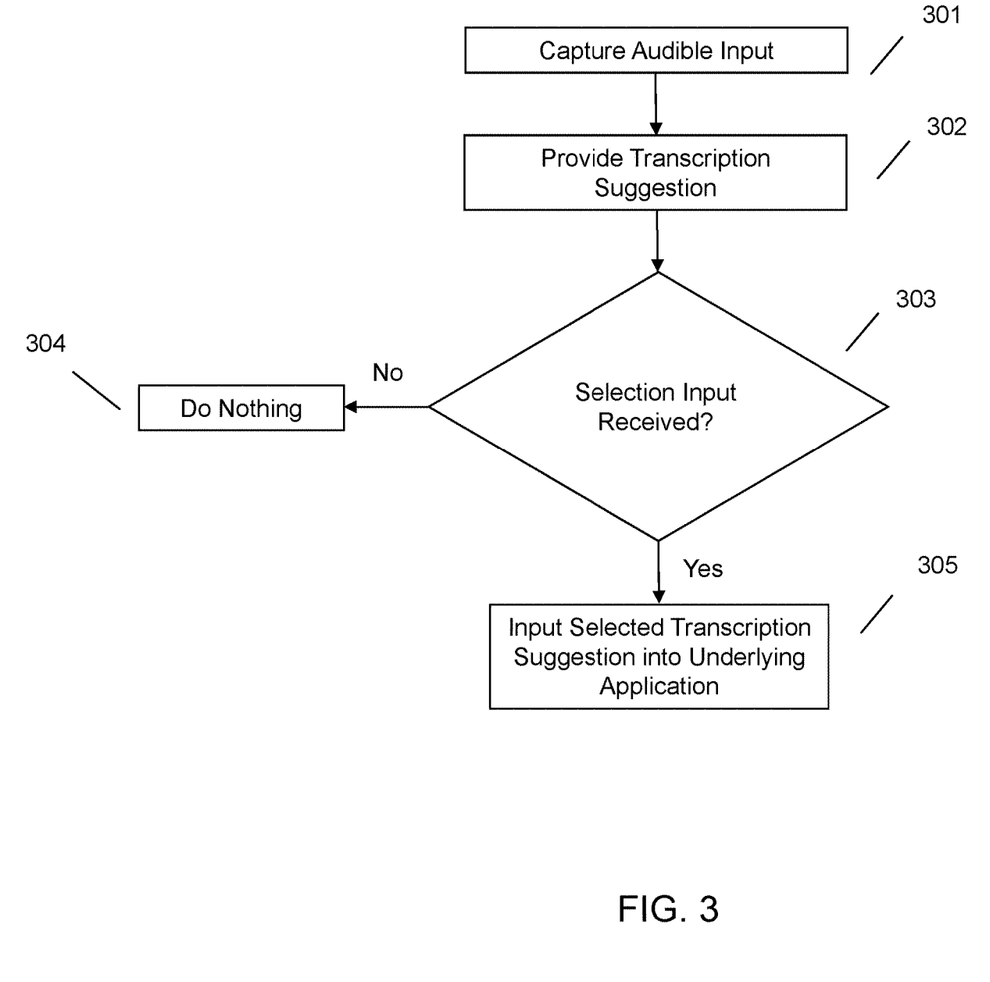
FIG. 3 illustrates an example method of transcribing audible input according to an embodiment.

Referring now to FIG. 3, an embodiment may transcribe and selectively input portions of voice input to an underlying application. At 301, an embodiment may capture audible input from at least one user. In an embodiment, the audible input may be input that is intended to be expletively directed to the device (e.g., an audible user command, query, statement, etc.) or it may be dialogue exchanged between individuals that is passively captured by the device. In an embodiment, the audible input may be captured using one or more audible input devices (e.g., microphones, etc.) integrally or operatively coupled to the device. Responsive to capturing the audible input an embodiment may automatically transcribe the audible input and store the transcription in an accessible storage location (e.g., stored locally on the device, stored remotely on another device, etc.). In an embodiment, the transcription may occur in substantially real-time as the audible input is being captured.

At 302, an embodiment may provide at least one transcription suggestion to a user. In the context of this application, the transcription suggestion ("suggestion") may be a portion of the transcribed audible input that is presented to the user for selection. In an embodiment, each suggestion may correspond to a transcribed portion of the audible input. In an embodiment, the audible input may be segmented into particular transcribed portions based upon one or more segmentation settings. For example, an embodiment may segment each completed audible sentence in the input stream (e.g., identified by pauses between speech that may indicate the end of a phrase, etc.). As another example, an embodiment may segment the audible stream the based upon the identity of an input provider. More particularly, all of the input provided by one speaker may be segmented and grouped away from the input provided by other speakers. In yet another example, an embodiment may segment the audible stream by topical context. More particularly, natural language processing could identify changes in context and use this data to split phrases into groups. In yet a further example still, an embodiment may segment the audible stream by identifying the input provided by local participants (e.g., heard via a microphone, etc.) as opposed to input provided by remote participants (e.g., heard electronically, etc.). In yet a further example still, specific data types (e.g., phone numbers, proper names, statistical numbers, etc.) may be segmented from the audio stream and grouped with like data types. Other segmentation techniques not explicitly mentioned here may also be utilized alone or in combination with the foregoing.

In an embodiment, the suggestion may be provided on a display device integrally or operatively coupled to the device. For example, the suggestion may appear in a popup window located at a predetermined portion of the user's screen (e.g., a periphery of the user's screen, etc.). As another example, a dedicated window may be open on a portion of the user's screen that contains each new suggestion. In an embodiment, the window may comprise only the most recent suggestion or it may comprise a history of past suggestions. In an embodiment, multiple suggestions may be provided to the user. The multiple suggestions may be provided one at a time or may be simultaneously displayed to the user. In an embodiment, the suggestions may be prioritized and ranked based upon predicted relevance to the user. For example, an embodiment may identify multiple suggestions that may be relevant to a user. In the case of single suggestion display, an embodiment may only display the highest ranked suggestion. Alternatively, in the case of simultaneous suggestion display, the highest ranked suggestion may be the suggestion that is at the top of a list.

In an embodiment, the suggestions may be associated with audio input that was part of a video/web conference in which other content (e.g., PowerPoints, PDFs, other visual and/or audio data, etc.) may have been presented concurrently with the audio input. In such a situation, the suggestion may also contain an indication of these other pieces of content. For example, if a suggestion corresponds to audio discussing subject matter on slide 8 of a 20 slide PowerPoint, an embodiment may indicate, in the suggestion, that slide 8 is the relevant slide and may include one or more images present on slide 8.

In an embodiment, the provision of the suggestion may be triggered by one or more predetermined factors, which will be more fully described herein. In an embodiment, the provision of the suggestion may occur substantially immediately after capturing the audible input. For example, an embodiment may provide the suggestion substantially immediately after the audio input is transcribed. In a similar embodiment, the suggestion may be provided to the user after a predetermined time (e.g., 2 seconds, 5 seconds, 10 seconds, etc.) has passed since the audio has been transcribed.

In an embodiment, the provision of the suggestion may occur responsive to identifying user input that corresponds to the audio represented by the suggestion. For example, a phrase from a meeting may read "our profits last quarter increased by 25 percent". If a human transcriber begins to type in the underlying application one or more words corresponding to the phrase (e.g., "our profits . . . "), then an embodiment may provide a suggestion that comprises the remaining words in the phrase (e.g., " . . . last quarter increased by 25 percent").

In an embodiment, the provision of the suggestion may occur responsive to identifying that a portion of the audio input is being provided by a particular user. More particularly, a predetermined ruleset may indicate that a user only wants content spoken by a particular speaker (e.g., Speaker A) to be transcribed and included in an underlying application. Responsive to determining (e.g., using one or more conventional audio-user association techniques, etc.) that audio input provided by Speaker A has been captured, an embodiment may automatically provide a transcribed suggestion of the audio input provided by Speaker A to the user. However, if audio input is captured and is determined to have been provided by another speaker (e.g., Speaker B) then no suggestion is provided to the user. In a similar embodiment, the provision of the suggestion may occur responsive to identifying that a portion of the audio input corresponds to a predetermined topic or context. More particularly, a predetermined ruleset may indicate that a user only wants content related to a specific topic or context to be transcribed and included in an underlying application. If audio input is captured and determined to be related to that topic or context, an embodiment may provide a suggestion comprising the phrase related to the topic or context to the user. In yet another similar embodiment, the provision of the suggestion may occur responsive to identifying that a portion of the audio input is associated with a predetermined alphanumeric set (e.g., a particular number, word, combination thereof, etc.). More particularly, a predetermined ruleset may indicate that a user only wants content associated with the predetermined alphanumeric set transcribed and included in an underlying application. Responsive to identifying the predetermined alphanumeric set in the audio input, an embodiment may provide a suggestion comprising the alphanumeric set to the user.

At 303, an embodiment may identify whether selection input is received on a suggestion. In an embodiment, a user may select a suggestion using one or more selection input means (e.g., touch input, mouse input, keyboard input, voice input, gesture input, etc.). Responsive to not identifying, at 303, that any selection input was received, an embodiment may, at 304, take no additional action. For example, an embodiment may take no additional action if no selection input is received on a provided suggestion within a predetermined time frame (e.g., 10 seconds, 30 seconds, etc.). Conversely, responsive to identifying, at 303, that a selection input was received on a suggestion, an embodiment may, at 305, input the selected suggestion into an underlying application.

In an embodiment, the underlying application may be virtually any application capable of receiving transcription input. For example, an application may be a note-taking application into which selected suggestions may be input. As another example, an underlying application may comprise one or more input fields into which the selected suggestion may be provided. In an embodiment, the inputted suggestions may be visually distinguished from one another based upon the provider of the input. For example, an embodiment may identify an association between each provider of audible input and the corresponding transcription of that input. An embodiment may then visually distinguish, in the underlying application, the transcribed input associated with one provider with the transcribed input associated with another provider. For instance, all selected suggestions provided by Speaker A may be displayed in green whereas all selected suggestions provided by Speaker B may be displayed in blue. As another example, the inputted suggestions may be organized in different portions of the underlying application. For instance, all selected suggestions provided by Speaker A may be on the left side of the application whereas all selected suggestions provided by Speaker B may be on the right side of the applications. Other methods for visually distinguishing the selections not explicitly mentioned here may also be used.

Figure 4:
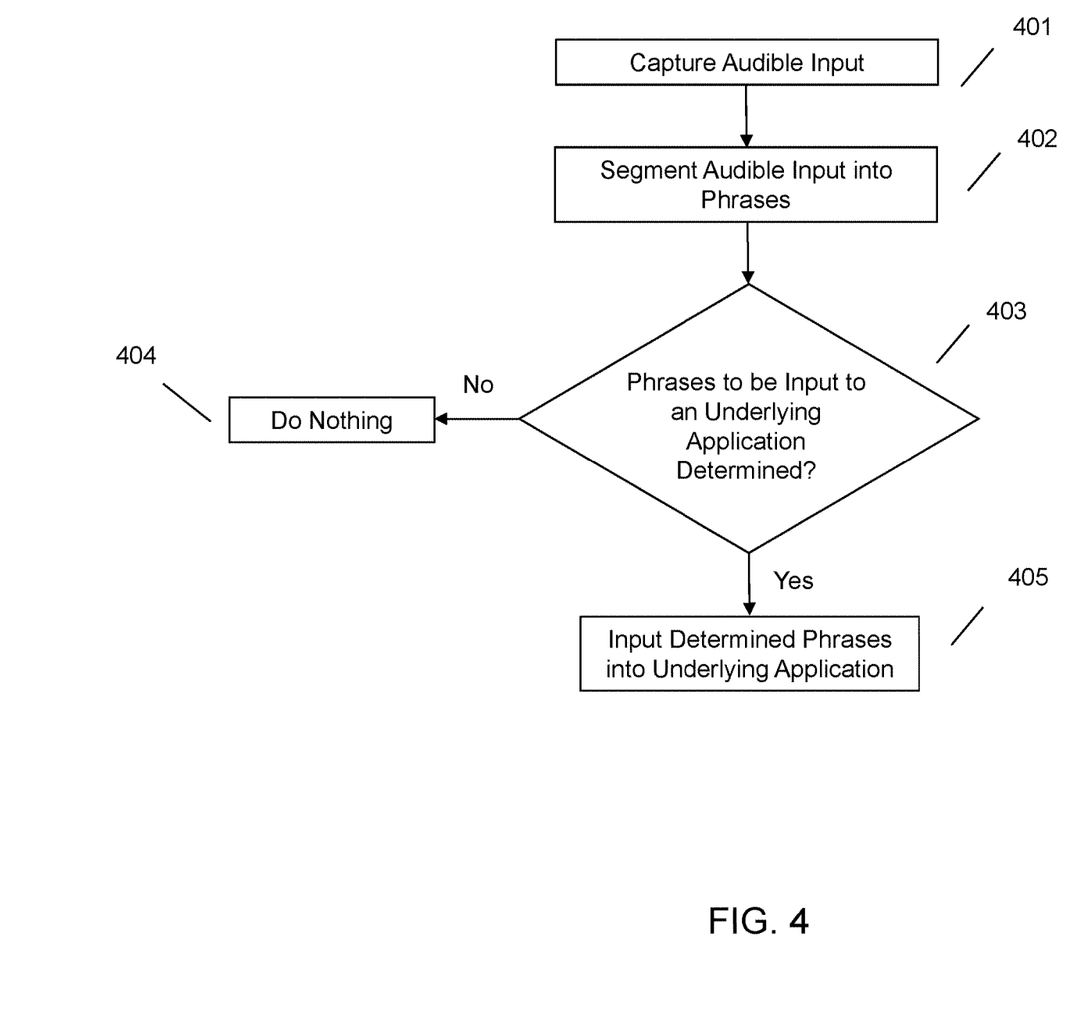
FIG. 4 illustrates another example method of transcribing audible input according to an embodiment.

Although the disclosure up to this point has primarily focused on inputting suggestions that have been selected by a user to an underlying application, an embodiment may also dynamically determine which suggestions should be provided to an underlying application without receiving user selection input. More particularly, referring now to FIG. 4, an embodiment may capture, at 401, audible input and segment, at 402, the audible input into transcribed phrases. Methods to segment the audible input into transcribed phrases have been previously discussed in this application and will not be repeated again here. At 403, an embodiment may determine which of the segmented phrases should be input to an underlying application. In an embodiment, the determination may derived by consulting a predetermined ruleset that defines which phrases should be input to the underlying application. In an embodiment, the predetermined ruleset may be set by a manufacturer and/or may be adjusted by a user. Responsive to determining which of the phrases to input to an underlying application, an embodiment may, at 405, input the determined phrase to the underlying application.

The various embodiments described herein thus represent a technical improvement to audible input transcription techniques. Using the techniques described herein, an embodiment may capture audible input provided by one or more users. An embodiment may then transcribe the captured audible input and provide a transcription suggestion to a user. The transcription suggestion may correspond to a transcribed portion of the audible input. Responsive to receiving a user selection input on the transcribed suggestion or responsive to intelligently determining which of the transcribed phrases to input to an underlying application, an embodiment may input a selected or determined suggestion into an underlying application. Such a method may allow a user to quickly input relevant data into an application without having to fully type it.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   capturing, at an information handling device, audible input from at least one speaker;
   identifying, using a processor, that a portion of the audible input corresponds to a user's interest and wherein the portion references an article of media present in a data file, wherein the data file is a slideshow comprising a plurality of slides and wherein the article of media is an image present in one of the plurality of slides; and
   providing, on a display device operatively coupled to the information handling device, at least one transcription suggestion associated with the portion, wherein the at least one transcription suggestion contains a transcription of the portion of the audible input and a reproduction of the image.

2. The method of claim 1, wherein the providing comprises providing the at least one transcription suggestion substantially immediately after capturing the audible input.

3. The method of claim 1, wherein the providing comprises providing the at least one transcription suggestion responsive to identifying user input corresponding to the portion.

4. The method of claim 1, wherein the providing comprises providing the at least one transcription suggestion responsive to identifying that the portion corresponds to a predetermined user.

5. The method of claim 1, wherein the providing comprises providing the at least one transcription suggestion responsive to identifying that the portion comprises a predetermined alphanumeric set.

6. The method of claim 1, wherein the providing comprises prioritizing the at least one transcription suggestion based on a ruleset.

7. The method of claim 1, wherein the user's interest is associated with at least one of an audio input provider from the at least one user and a topic.

8. The method of claim 1, further comprising inputting, responsive to receiving a selection input on the at least one transcription suggestion, the at least one transcription suggestion into an underlying application.

9. The method of claim 8, further comprising identifying an association between a user and the portion of the audible input and visually distinguishing, in the underlying application, the portion associated with the user from another portion associated with another user.

10. The method of claim 1, further comprising segmenting, using a ruleset, the audible input into at least one transcribed phrase, wherein the at least one transcription suggestion corresponds to the at least one transcribed phrase.

11. The method of claim 1, further comprising identifying additional content associated with the audible input, wherein the transcription suggestion comprises at least a portion of the additional content.

12. An information handling device, comprising:
    a display device;
    a processor;
    a memory device that stores instructions executable by the processor to:
    capture audible input from at least one speaker;
    identify that a portion of the audible input corresponds to a user's interest and wherein the portion references an article of media present in a data file, wherein the data file is a slideshow comprising a plurality of slides and wherein the article of media is an image present in one of the plurality of slides; and
    provide, on the display device, at least one transcription suggestion associated with the portion, wherein the at least one transcription suggestion contains a transcription of the portion of the audible input and a reproduction of the image.

13. The information handling device of claim 12, wherein the instructions executable by the processor to provide comprise instructions executable by the processor to provide the at least one transcription suggestion substantially immediately after capturing the audible input.

14. The information handling device of claim 12, wherein the instructions executable by the processor to provide comprise instructions executable by the processor to provide the at least one transcription suggestion responsive to identifying user input corresponding to the portion.

15. The information handling device of claim 12, wherein the instructions executable by the processor to provide comprise instructions executable by the processor to provide the at least one transcription suggestion responsive to identifying that the portion corresponds to a predetermined user.

16. The information handling device of claim 12, wherein the instructions executable by the processor to provide comprise instructions executable by the processor to provide the at least one transcription suggestion responsive to identifying that the portion comprises a predetermined alphanumeric set.

17. The information handling device of claim 12, wherein user's interest is associated with at least one of an audio input provider from the at least one user and a topic.

18. The information handling device of claim 12, wherein the instructions are further executable by the processor to input, responsive to receiving a selection input on the at least one transcription suggestion, the at least one transcription suggestion into an underlying application.

19. The information handling device of claim 18, wherein the instructions are further executable by the processor to identify an association between a user and the portion of the audible input and visually distinguish, in the underlying application, the portion associated with the user from another portion associated with another user.

20. A method, comprising:

capturing, at an information handling device, audible input from at least one speaker;

segmenting, using a processor, the audible input into one or more transcribed phrases;

determining, by accessing a predetermined ruleset, which of the one or more transcribed phrases to input to an underlying application, wherein the determining comprises identifying that a portion of the audible input corresponds to a user's interest and wherein the portion references an article of media present in a data file, wherein the data file is a slideshow comprising a plurality of slides and wherein the article of media is an image present in one of the plurality of slides; and automatically inputting, without user selection input, the determined one or more transcribed phrases to the underlying application as well as a reproduction of the image.

* * * * *